United States Patent [19]
Bedi

[11] Patent Number: 4,951,784
[45] Date of Patent: Aug. 28, 1990

[54] PROCESS AND DEVICE FOR SIMPLE, HIGH SPEED OIL CHANGE AND/OR FLUSHING AND AIR PURGING OF THE MOVING COMPONENTS OF THE CRANKCASE IN AN INTERNAL COMBUSTION ENGINE

[75] Inventor: Ram D. Bedi, Birmingham, Mich.

[73] Assignee: K. J. Manufacturing, Wixom, Mich.

[21] Appl. No.: 433,355

[22] Filed: Nov. 8, 1989

Related U.S. Application Data

[63] Continuation-in-part of Ser. No. 413,008, Sep. 26, 1989, which is a continuation-in-part of Ser. No. 350,303, May 11, 1989, Pat. No. 4,884,660.

[51] Int. Cl.[5] .............................................. F16N 33/00
[52] U.S. Cl. .................................... 184/1.5; 184/6.21; 123/196 A; 123/196 R
[58] Field of Search ...................... 184/1.5, 6.21, 6.24, 184/55.1; 123/196 A, 196 R, 196 S

[56] References Cited

U.S. PATENT DOCUMENTS

| | | | |
|---|---|---|---|
| 1,884,820 | 10/1932 | Osborne | 184/1.5 |
| 1,886,098 | 11/1932 | Hedglon | 184/1.5 |
| 2,554,389 | 5/1951 | Stevens | 184/1.5 |
| 2,594,779 | 4/1952 | Huffman | 184/1.5 |
| 3,489,245 | 1/1970 | Broadwell | 184/1.5 |
| 3,720,287 | 3/1973 | Martel | 184/1.5 |
| 4,676,206 | 6/1987 | DeGrazia, Jr. | 184/1.5 |
| 4,884,660 | 12/1989 | Bedi | 184/1.5 |

*Primary Examiner*—Ira S. Lazarus
*Assistant Examiner*—Alan B. Cariaso
*Attorney, Agent, or Firm*—Basile and Hanlon

[57] ABSTRACT

A process and apparatus for changing the oil in an engine and/or flushing and scrub cleaning the moveable components in the engine utilizing the internal lube oil distribution system of the engine. The device includes an oil filter adapter positioned in the oil filter boss, a remote oil filter mounting boss and inlet and outlet hoses connecting the two. The device is mounted in the engine compartment. Suitable pump-out and fill lines are connected to the device and can be releasably attached to an external pump device. When the device is employed to change oil, the external pump device is connected, a brief surge of purge gas is introduced to remove spent oil remaining in the oil filter and internal lube oil passages and spent oil is removed from the oil pan through the pump-out line. A measured amount of fresh oil is then introduced through the fill line and the internal lube oil distribution system. Once accomplished, the external pump device is uncoupled. When thorough engine cleaning is required, a suitable flushing fluid is introduced under pressure through the fill line, engine filter, and internal oil distribution system after the spent oil is pumped out. The flushing fluid can be recirculated as desired to achieve thorough cleaning and, then, after a brief surge of purge gas is introduced through the filter and lines, the flushing fluid is removed through the pump-out line and the engine filter changed, if desired.

27 Claims, 3 Drawing Sheets

PROCESS AND DEVICE FOR SIMPLE, HIGH SPEED OIL CHANGE AND/OR FLUSHING AND AIR PURGING OF THE MOVING COMPONENTS OF THE CRANKCASE IN AN INTERNAL COMBUSTION ENGINE

CROSS-REFERENCE TO RELATED APPLICATIONS

This application is a continuation-in-part of Ser. No. 07/413,008 filed Sept. 26, 1989 which is a continuation-in-part now pending of 07/350,303 filed on May 11, 1989 now U.S. Pat. No. 4,884,660.

BACKGROUND OF THE INVENTION

1. Field of the Invention

This invention relates to a method and device for changing motor oil, and, optionally, flushing the motor oil reservoir and crankcase components in internal combustion engines of all sizes. Such internal combustion engines can be found on automobiles, trucks, tractors, heavy earth moving equipment, military equipment, stationary equipment or the like. More particularly, this invention relates to processes in which residual spent oil and other contaminants retained and adhering to the surfaces of the internal engine lube oil flow channels of the engine components such as the crankshaft, bearings, connecting rods, filter, oil cooler, etc. of the internal combustion engine are expediently removed. This invention also relates to a device and method for removing the retained spent motor oil in the lube oil flow channel/channels and replacing it with a suitable amount of fresh motor oil in an integrated self-contained process at high speeds with almost no exposure to oil vapors of the spent fresh engine oil.

2. Background of the Relevant Art

The benefits of routine oil changes to internal combustion engines are well known. Routine engine or lube oil changes have been shown to increase engine life and performance. With repeated prolonged use, motor oil builds up metallic and non-metallic suspended particles from the abrasive and or the adhesive wear of engine parts against one another and from products of incomplete combustion and improper air intake. The particles, in turn, cause abrasive wear of the engine bearings, piston rings and other moving parts and result in the reduction of the motor oil lubricity as various additives and lubricating components become depleted. This adversely effects engine performance and, if left unchanged, can destroy or cripple the engine performance.

It is recommended by at least one oil manufacturer that total solid concentration be limited to levels below 3.0% with levels of silica being present in amounts lower than 25 ppm and sodium in amounts lower than 200 ppm.

To obtain satisfactory automotive engine performance, and maintain solid concentration levels in the motor oil lower than the recommended 3.0%, changing the motor oil in an automobile engine is a necessary, but an undesirable, dirty, and time-consuming task. As vehicles are presently designed, the oil pan serves the purpose of a reservoir for circulation of engine oil. Engine oil is drawn from the oil pan where it is pumped under pressure through internal oil distribution passages drilled in the engine block, crank shaft, connecting rods, bearings, etc. The oil exits the internal oil distribution passages through various carefully positioned openings to lubricate the reciprocating and rotating parts of the engine. The motor oil then drains back to the oil pan for recirculation through the automobile oil filter as well as any oil cooler units present in larger vehicles such as large trucks and back into the lube oil passages. To prolong oil usefulness, the oil is passed through an oil filter mounted on the engine. For example in passenger cars the filter may be mounted at the bottom of the engine block. Once the oil becomes contaminated, the spent oil must be changed to prolong engine life. At such oil changes, it is also recommended that the oil filter also be replaced. For higher compression engines, to increase gas mileage, frequent oil changes become even more important.

In the conventional oil change process the drain plug, located in the lowermost region of the oil pan, is opened. The degraded (spent) oil containing suspended particles is permitted to flow under gravity out of the pan into a suitable receptacle. After the spent oil is removed, the used oil filter can be removed and replaced. The drain plug can, then, be replaced and fresh oil added to the engine; usually through a separate opening, such as in the engine valve cover. During the process the oil filter is unscrewed and replaced.

The process of gravity drainage does not remove all of the spent oil with its metallic and non-metallic particulates which is retained in oil flow channel components because gravity drainage provides only minimum scrub cleaning or scouring action and cannot dislodge strongly adhering particulates and degraded oil components. A significant portion sticks to the oil pan walls, and to the surfaces and passages of engine oil flow components such as the crank shaft, connecting rods, pistons engine block, cylinder head and the like. Another portion remains as residual oil in the oil filter, engine lines, and oil cooler coils. This creates two problems. First degraded oil components and particles remain to be mixed with fresh motor oil. The concentration of contaminants is lowered by dilution but only a part of the total contaminants are eliminated. Thus the engine is never exposed to truly fresh oil in a completely clean engine environment. Second, a portion of spent oil remains in the oil filter. This amount can constitute up to 20% of the total oil present in the engine. When it remains in the oil filter, this retained oil is removed when the oil filter is replaced. Even more important is the fact that the oil contained in the old filter cannot be efficiently recycled or reclaimed. This poses environmental hazards and wastes a valuable recyclable resource.

Conventional oil change processes are essentially the same whether performed at home, at service stations or in rapid oil change centers which have opened in various recent years. Spent or dirty oil is allowed to collect in the oil pan and is, then, permitted to drain from the oil pan through the drain plug opening located in the lowermost portion of the oil pan. The drain plug opening is, then, closed and fresh oil is added to the crankcase and oil pan through a suitable opening such as the valve cover. Used oil filters with their burden of spent oil are discarded and new empty oil filters are inserted in their place.

In this basic procedure, the oil pan and crankcase never drain completely. Oil containing suspended, gelatinous, and sticky particles remains on the walls of the pan and the surfaces of the crankcase components, and in the various oil distribution passages, to mix with the fresh oil added during the conventional oil change process and subsequent engine use. This reduces the life of the oil filter which, in turn, further reduces the life of the engine itself over an extended period of time.

The oil change process in the so-called quick oil change or ten-minute oil change centers is faster than that performed by other automotive service centers simply because the focus of the total service business is directed to oil changes only. Quick oil change centers are more efficient simply because they are organized to be so. The rate of oil drainage and oil fill rates are the same as those of service stations because of the constant drainage and filling force limited by gravity. Also, the process employed in these oil change centers does not clean the crankcase components any better than other conventional oil change processes. Thus, while in stations and rapid oil change centers, the process can be simplified with the use of hydraulic racks, special oil collection receptacles and the like, the basic procedure of drainage through a restricted drain opening, removal of the oil-laden oil filter, replacement with a empty filter finally, oil replacement is standard and as is gravity.

This basic procedure has several drawbacks. It is time-consuming. The speed with which the oil drains through the drain plug opening is limited by that restrictive opening and by gravity. In commercial settings, this can detain personnel and valuable, expensive resources such as hydraulic racks while waiting for the oil to drain. As previously indicated, the oil pan never drains completely. Oil containing suspended and sticky particles adheres to the walls of the pan to be mixed with the new oil added. This reduces the life of the oil filter which further reduces the life of the engine itself over extended use for a period of years.

The basic process is also messy and exposes the operator to undesirable oil vapors. The drained oil must be moved, handled and, ultimately, disposed of in an appropriate manner. Drainage into open containers increases opportunities for spillage and mishandling and exposure. Fresh oil introduced into the opening in the engine valve cover can be accidentally spilled in the engine compartment. The spilled oil can smoke and burn if spilled on the manifold and can attract dirt and grime, regardless.

Many processes and devices have been proposed to remove residual oil and contaminants from the oil pan and/or crankcase components. U.S. Pat. No. 2,554,389 to Stevens discloses a crankcase cleaning apparatus which has a non-retractable spray wand which is adapted to extend into the oil pan through the drain plug opening and be fixed relative thereto. An unspecified cleaning fluid is sprayed under pressure through the wand to contact the interior surfaces of the oil pan and limited portions of the crankcase to dislodge any residual contaminants. The fluid and dislodged contaminants are allowed to drain out through the drain plug opening and are collected in a liquid receiver situated on the exterior of the oil pan for collection and eventual reuse. The fixed wand in this device does not permit efficient and complete cleaning of the interior lube passages of the lube oil components. Additionally, the manner in which the cleaning fluid is collected brings with it an elevated risk of spillage.

U.S. Pat. No. 3,489,245 to Broadwell discloses an apparatus for flushing oil pans of internal combustion engines after the spent oil has been removed from the pan. Flushing fluid can be introduced into the oil pan and crankcase through a spray nozzle which is mounted in the drain plug opening. The device disclosed in Broadwell does not permit introduced cleaning fluid to thoroughly contact the interior surfaces and passages of the lube oil flow components and the oil pan and dislodge adhering solid and oil contaminants and oil. The spray nozzle apparatus disclosed in the Broadwell reference includes a complex recirculating system to pump and process the sprayed cleaning fluid. This system can never completely remove all residual oil and cleaning fluid which accumulates in the bottom of the oil pan opening and nozzle assembly. Furthermore the system cannot be used to accomplish an oil change.

U.S. Pat. No. 2,594,779 to Huffman discloses a crankcase cleaning device in which a spray nozzle is attached to a fitting which can be screwed into the drain plug opening when the spray nozzle is used. A suitable cleaning fluid is directed onto the surfaces of the crankcase and the oil pan to remove contaminants. The crankcase can then be prelubricated by spraying a suitable lubricating agent through the spray nozzle onto the newly cleaned surfaces. Once this is done, the nozzle device is removed. The spent cleaning fluid and residual prelubricating liquid are, then, allowed to drain from the oil pan through the drain plug opening. As with the Stevens and Broadwell references, the device disclosed in Huffman lacks the ability to completely and safely remove residual contaminants remaining in the lube oil flow passages and on the surfaces of the oil flow engine components and also lacks a method for rapid efficient oil change.

The Huffman reference appreciates the dangers inherent in operating an engine without sufficient prelubricating fluid on its components. However like all the references, it fails to appreciate the volume of the empty new oil filter which must be filled with circulating fresh oil before any of the fresh oil reaches the parts which require lubrication.

In all oil change operations, including that disclosed in Huffman, when the new empty filter is installed, a time period exists in which engine oil is not reaching the moving components of the engine. Once the engine is started, the oil pump which circulates lubricating oil throughout the engine, must first fill the empty new filter. It must then fill the lube oil distribution passages. It is only after these volumes have been filled that fresh oil comes in contact with the engine parts requiring lubrication. It has been noted in the industry that most engine wear occurs in the first few seconds of engine operation due to he absence of lubrication film on the engine parts while the new empty engine oil is being filled by the engine oil pump.

U.S. Pat. No. 1,886,098 to Hedglon discloses an oil change system which is particularly adapted to stationary engines. The device disclosed in Hedglon includes a drain pipe permanently disposed in the drain opening of the engine. The drain pipe is permanently connected to suitable storage reservoirs and waste storage reservoirs by means of a suitable pipe. All lubricating and flushing fluids enter and leave the crankcase and oil pan by way of the drain pipe. This configuration makes it extremely difficult to contact remote regions of the crankcase with flushing fluid or introduced lubricating oil. Additionally, the system does not provide a means whereby introduced flushing fluid can be filtered and recirculated. Finally the Hedglon reference is silent about handling and disposal of the engine oil filter.

As can be appreciated, none of these devices present an integrated and efficient method for cleaning and lubricating the various recessed surfaces such as lube oil passages of the crankcase and oil pan and changing the engine oil at high speed. Furthermore none of these methods present a ready, easily implemented solution to the problem of oil filter removal and replacement. The previously known processes implicitly assume that the oil-laden filter will be discarded and a dry filter reinserted in its place. This process is wasteful and exposes the engine components to unnecessary wear during initial stages of engine operation, particularly after an oil change and filter replacement while the new oil filter and lube oil distribution passages refill with fresh oil.

Thus, it would be desirable to provide a process which accelerates removal of spent oil, associated contaminants, and degraded oil additives to permit eventual replacement with fresh engine oil in an essentially clean container in a unified process at one single location in an associated vehicle. It is also desirable to provide a method and device by which an oil change or oil change and crankcase components flushing operation can be accomplished which also eliminates the amount of spent and fresh oil handling and exposure. Finally it is desirable to provide a process which could easily be employed by the vehicle owner with all the benefits of the method of the present invention such as time saving, convenience, no spills, cleaner oil pans and engine components parts, with a minimum or no exposure to motor oil and, finally, longer lasting engines.

SUMMARY OF THE INVENTION

The present invention is a process and apparatus for high speed oil change in an internal combustion engine having a crank case and an oil pan. The process can also include optional flushing steps. In the process of the present invention, the amount of spent oil removed from the engine is maximized and the amount of time in which the engine is required to operate after oil change with a substandard amount of lubrication is minimized or eliminated. This is accomplished by thoroughly removing spent oil from the used oil filter and engine passages prior to eventual removal of the old filter. Fresh oil for lubrication is introduced by a process which refills the engine lube oil distribution passages and the new oil filter with fresh oil prior to engine start-up.

The device of the present invention includes an oil filter adapter sealingly connected to an oil filter mounting boss located integrally in the engine block. The adapter has at least two nozzles to which a first inlet hose and a second outlet hose are attached. The first inlet hose and second outlet hose are connected to a remotely disposed oil filter mounting boss to which the engine oil filter can be sealingly mounted. The remotely disposed mounting boss has a bracket which can be attached to the exterior surface of the cylinder head or engine block or any readily accessible position.

The device also includes a pump-out hose which is attached to the drain opening of the oil pan. The pump-out hose has a suitable quick connect suction fitting which can be releasably connected to an external pump device which can direct the fluid flow at will. When connected to the external pump device the pump-out hose is the first inlet hose to permit recirculation of fluids through the engine oil filter and any pump filters as desired.

The second outlet hose has a first end connected to the remotely disposed mounting boss and a second end attached to the oil filter adapter in a manner which permits the second outlet hose to be in fluid communication with the internal lube oil circulation passages in the various engine components. A fill line having a suitable quick connect pressure coupling is connected to the first inlet hose at a location upstream of the oil filter between the oil filter and the engine. The fill line is connected to the external pump device to permit the introduction of fluids as desired.

The present invention also includes an external pump device. The external pump device can be any suitable device which can accomplish the oil pump-out, engine cleaning and oil change of the method of the present invention. The present invention encompasses one suitable external pump device which includes a pump-out/-recirculation unit, an air purge unit, an oil fill unit, a pump device fill line having a suitable quick connect coupling, and an emptying line having a suitable quick connect coupling.

In the method of the present invention, a rapid efficient oil change can be performed using the device described previously by connecting the quick connect pressure and suction members to mating members on a suitable external pump device such as the device of the present invention. Once connected, a brief surge of air at a desirable pressure can be introduced through the main air line into the filter and oil distribution passages force the spent oil which remains in these areas back into the oil pan. During this air purge or immediately following it, a suction force can be exerted through the pump-out line to remove the spent oil which has collected in the oil pan. Once the spent oil has been removed, if desired, the empty old engine oil filter can be replaced with a new empty filter. An appropriate amount of fresh motor oil is introduced under pressure, into the engine oil filter, through the internal lube oil circulation passages and into contact with the moveable engine components requiring lubrication. The pumping pressure is sufficient to permit contact between the fresh oil and the moveable engine parts. The amount of fresh lube oil introduced is that amount which is appropriate for the respective engine. After the fresh oil is introduced the coupling members can be removed and normal oil circulation through the filter can commence.

Where thorough crankcase cleaning and flushing is required, a suitable flushing fluid may be introduced through the fill line and first inlet hose upstream of the old oil filter at any time before, during or after removal of the spent oil from the oil pan. The flushing fluid is introduced under sufficient pressure to induce a spraying pattern which facilitates contact between the flushing fluid and all remote surfaces of the crankcase components. Flushing fluid introduced after removal of spent oil may be recirculated to the external pump device, filtered to remove particulate contaminants and reintroduced to the crankcase in a cycle which continues until cleaning is complete. The desirable quantity of the flushing fluid will vary from engine to engine depending on engine type and cleaning circumstances.

After cleaning is complete, the flushing fluid can be removed and an air purge instituted to remove the mixture of residual oil and flushing fluid from the on-board car filter and internal lube oil distribution passages. When crank case cleaning is completed, the oil filter can be changed during or after the flushing fluid is emptied through the pump-out hose. Fresh motor oil can be introduced in the manner described previously.

BRIEF DESCRIPTION OF THE DRAWING

In the present description, reference is made to the following drawing in which like reference numerals are used to refer to like elements throughout the similar views and in which.

DESCRIPTION OF THE PREFERRED EMBODIMENT

The basic process of the present invention can be employed successfully with vehicles or stationary power plants having internal combustion engines which have oil pans or similar oil reservoirs and internal lube oil distribution passage systems. The term "internal oil lube distribution passage system" is defined as, but not limited to, the machined passages and circulation systems present in the engine block, cylinder head, crank shaft, cam shaft and connecting rods. Various engines will have differing lubrication requirements. Additionally, certain vehicles can include oil cooling systems in which residual oil can remain. Therefore it is understood that every engine may not have passages or circulation systems in all the enumerated components.

THE APPARATUS

Figure 1:
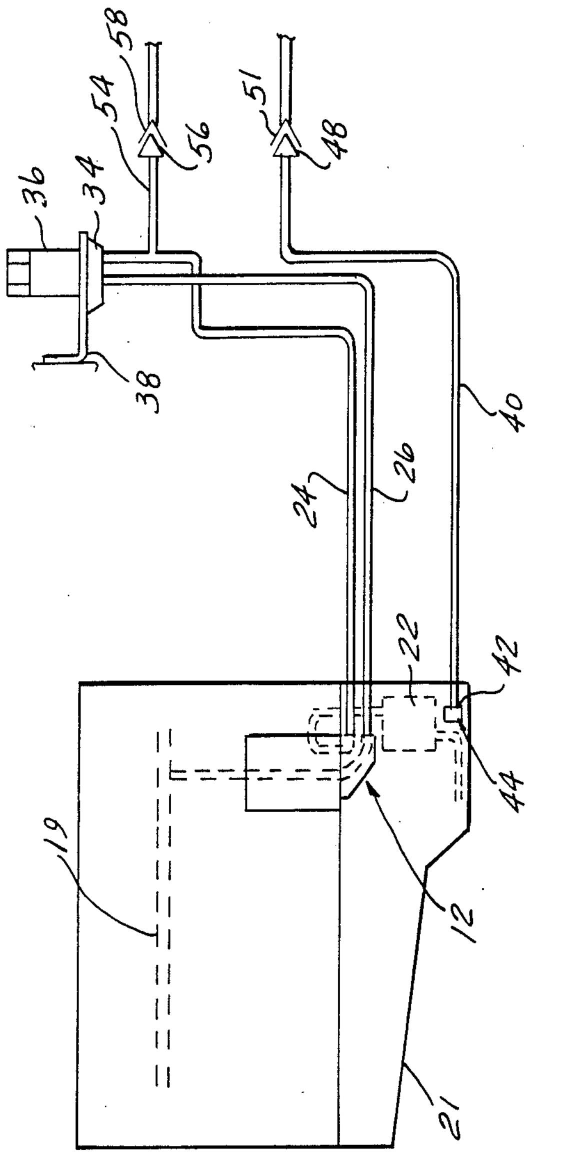
FIG. 1 is a schematic representation of the device of the present invention.
Figure 2:
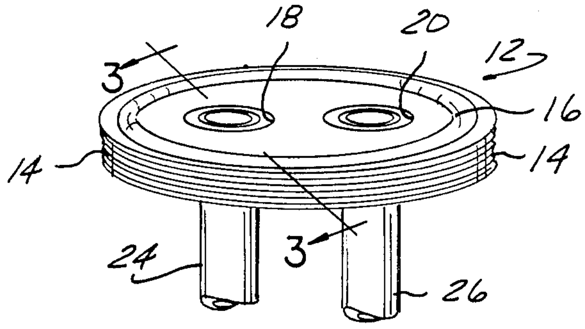
FIG. 2 is a detail drawing of the top view of oil filter adapter of the present invention.
Figure 3:
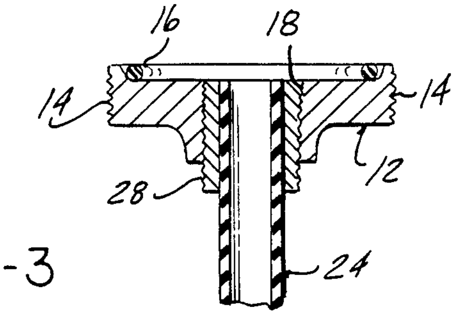
FIG. 3 is a cross-sectional view of the oil filter adapter taken along the 3—3 line of FIG. 2.
Figure 4:
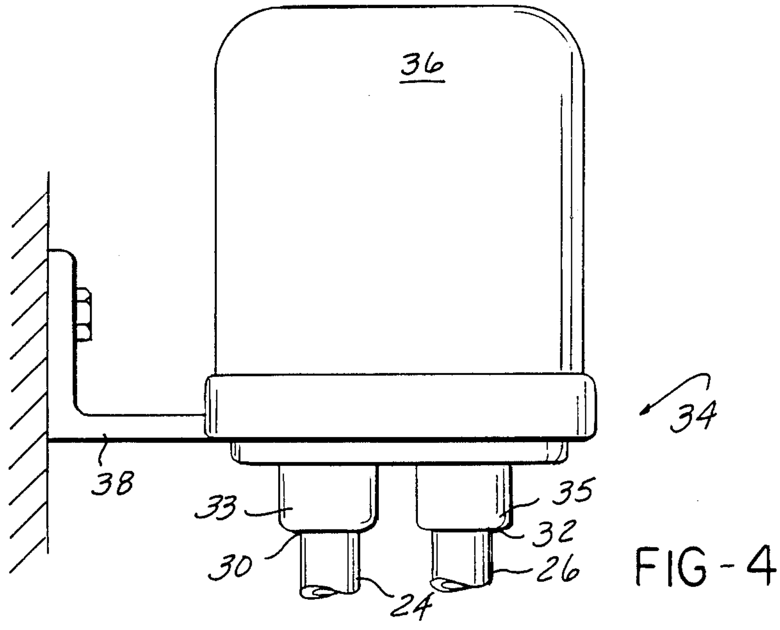
FIG. 4 is a detail drawing of the oil filter and remote oil filter mounting boss.

The apparatus 10 of the present invention, depicted schematically in FIG. 1, includes an oil filter adapter 12 shown in detail in FIGS. 2 and 3. The oil filter adapter 12 has an exterior threaded surface 14 and a suitable sealing member such as sealing gasket 16 which will permit the threaded surface to be inserted into the oil filter mounting boss located in the engine block of the associated internal combustion engine E. The oil filter adapter 12 has at least two nozzles, a first inlet nozzle 18 and second outlet nozzle 20 through which introduced fluids may flow. The first inlet nozzle 18 is in fluid communication with the engine oil pump 22 located in oil pan 21 while the second outlet nozzle 20 is in fluid communication with the internal lube oil distribution passage system 19 of the moving engine components.

The detailed configuration of one nozzle 18 is shown in FIG. 3. It is to be understood that nozzle 20 may be similarly configured. Furthermore, it is to be understood that nozzles 18, 20 may be shaped or have additional components such as elbows or the like to permit easy installation in the engine compartment of a vehicle. As shown in FIGS. 2 and 3, nozzles 18 and 20 have a first inlet hose 24 and a second outlet hose 26 attached to them. Inlet hose 24 has a suitable fastening means such as threaded end 28 which can be sealingly received in nozzle 18. Outlet hose 26 may be similarly fastened.

Inlet hose 24 and outlet hose 26 terminate in second ends 30 and 32, respectively, which are attached to a remote oil filter mounting boss 34 to which engine oil filter 36 is sealingly attached. The remote oil filter mounting boss 34 generally has nozzles 33, 35 which are configured similarly to those in the oil filter adapted 12. Remote oil filter mounting boss 34 will generally have internal threads (not shown) to receive the engine oil filter 36. Remote boss 34 also has a mounting bracket 38 to permit mounting to a suitable and accessible area in the engine compartment.

The inlet hose 24, outlet hose 26 and oil filter 36 comprise a circuit through which oil is pumped during normal engine operation. The oil pump 22 circulates the engine oil from oil pan 21, through inlet hose 18, through filter 36 and on to the various engine components through outlet hose 26 and the internal engine lube oil distribution passage system during conventional engine operation.

Figure 5:
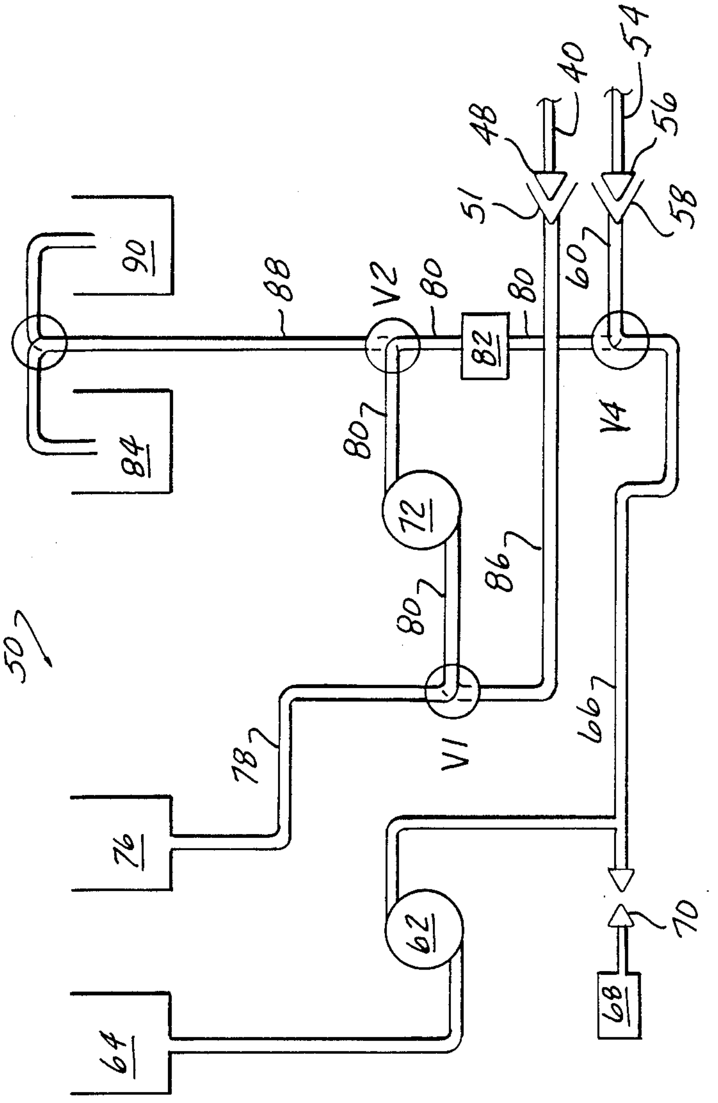
FIG. 5 is a schematic representation of the external recirculation pump employed in the present invention.

The device 10 of the present invention also includes a pump-out line 40 which has a first section 42 connected to oil pan 21 at the drain plug opening 44 of oil pan 21. Pump-out line 40 terminates in a quick connect suction coupling 48 adapted to be matingly received in a suitable coupling 52 on the external pump device 50 shown in FIG. 5 and described in detail subsequently.

A fill line 54 is connected to the inlet hose 24. Fill line 54 has a quick connect pressure coupling 56 adapted to be matingly received in a suitable coupling 58 on the external pump device 50.

The fluid introduced through fill line 54 flows into inlet hose 24, filter 36, and outlet 26 sequentially in the direction of arrows A which show oil or fluid direction. Fluid flow in the opposite direction does not occur because the pumping gears in oil pump 22 act as an effective valve preventing such reverse flow.

The external pump device 50 includes at least one pump for transferring fluids to and from the engine oil pan 21 and internal oil distribution passages 19 together with suitable fluid conveying conduits, filters, valves and the like. The external pump device 50 can also include an air purge unit which includes a source of compressed air, an optional air dehumidifier, and an air conveying conduit connected to a fill line 60 on the external pump device 50.

In the preferred embodiment, the external pump device 50, includes a dedicated fresh oil pump 62 which can convey fresh oil from a suitable fresh oil storage vessel 64 through an intermediate conveying line 66 to the fill line 60 which is equipped with coupling member 58 to matingly and releasably receive fill line 54 of device 12. A compressed air source 68 is connected to the intermediate conveying line 66 at valve 70. Compressed air source 68 comprise any suitable source for a compressed gas such as air cylinders or a suitable air compressor (not shown). The compressed air source 68 can also include an optional air drying unit (not shown) to eliminate moisture present in the introduced air.

The term "air" used herein is taken to include atmospheric air as well as any other suitable pressurized gas. Conventional compressed atmospheric air is preferred for reasons of economy and availability. The pressure of the compressed air is sufficient to empty the engine oil filter and lube oil distribution passages without causing undesired side effects.

In the preferred embodiment, the external pump device 50 also includes a recirculating pump 72 which is part of a general recirculating system 74. The recirculating system 74 includes flushing fluid reservoir 76, flushing fluid conveying line 78 connected at a first end to the flushing fluid reservoir 76 and at a second end to a central line 80 by valve V-1. Pump 72 and filter 82 are located in central line 80. Pump 72 and filter 82 are brought into fluid contact by positioning intermediate valve V-2 in its first position.

The valves such as V-1 and V-2 may be any type which will suitably direct or divert fluid flow as desired. In the preferred embodiment three-way valves are employed.

External pump device 50 also includes means for conveying spent oil or spent flushing fluid to suitable spent fluid collection receptacles 84, 90. The spent fluid conveying means includes an emptying line 86 to which coupling member 51 is attached and to which pump-out line 40 can be releasably connected. Emptying line 86 can be opened into central line 80 and thereby connected to pump 72 by moving valve V-1 into its second position. Valve V-2 is also rotated to its second position to connect central line 80 with waste conveying line 88. Waste conveying line 88 terminates at valve V-3 which is rotatable between a first position in which waste conveying line 88 is connected to spent oil collection vessel 84 and a second position in which the waste conveying line 88 connected to the spent flushing fluid collection receptacle 90.

External pump device 50 also includes means for recirculating flushing fluid through the engine to be cleaned and the external pump filter 82 through emptying line 86, into central line 80 through valves V-1 in the second position, and V-2 in the first position, respectively, past valve V-4 in the second position and into fill line 60 where it is introduced into fill line 54 of the device 10 of the present invention.

THE PROCESS

In order to better understand the devices 10 and 50 of the present invention, the oil change and crank case flushing process will now be discussed making reference to the various parts of the devices 10 and 50 as necessary.

In the proces sof the present invention, the major portion of the spent oil is removed from the oil pan 21 by a positive suction force exerted on the spent oil by external pump device 50. The pump-out may be accompanied by or preceded by an air purge to eliminate a significant portion of the residual oil remaining in engine oil filter 36, internal oil distribution passages, and any oil cooler present in the engine. The spent oil passes through pump-out line 40 and is ultimately conveyed to a suitable holding vessel 84 until the spent oil can be recycled or disposed of in an environmentally sound manner. The purge air passes from the external pump device 50 through fill line 54 into inlet hose 24 and on through the engine oil filter 36, outlet hose 26 and lube oil distribution passages 19 carrying oil on with it.

The introduced purge air is allowed to escape through engine openings such as valve covers and the like while the removed oil collects in the oil pan 21. The purge air is introduced under pressure sufficient to empty the engine filter, lube oil distribution passages, and any oil coolers without causing undesired side effects to the various engine components. In the preferred embodiment, the purge air is dried prior to introduction.

To accomplish this pump-out step using the external pump device 50 of the present invention, a suitably equipped engine is connected to the device 50. Valves V-1, V-2 and V-4 of the external pump device 50 are rotated to their second positions, pump 72 is actuated and value 70 is opened. In this manner, a brief surge of air can be introduced through fill line 60 to move oil remaining int he used oil filter, lube oil distribution passages, and optional oil cooler along with it. Spent oil which collects in the oil pan 21 can be withdrawn through pump-out line 40 to emptying line 86 of external pump device 50 where it is conveyed through emptying line 86, central line 80 and waste conveying line 88, into spent oil collection reservoir 84.

If desired or required, the engine oil filter 36 may be changed during the oil change process. This could occur at any time after air purged the engine oil filter 36 of spent oil contained therein.

When a thorough crankcase cleaning is not required, an appropriate amount of fresh motor oil can then be introduced into the engine through fill line 54 and second outlet hose 26. Because the outlet hose 26 is in fluid communication with the engine oil filter 36 and the internal lube oil distribution passage system of the engine, the fresh oil thus introduced passes through the passages in the internal lube oil distribution system to lubricate even remote, hard-to-reach surfaces of the moveable engine parts with fresh oil even prior to engine start up. The introduced oil which collects in the oil pan 21 is the appropriate quantity for recirculation through the lube oil distribution passage system when the engine is running and driving the internal oil pump 22.

The fresh motor oil is, preferably, introduced into the engine compartment under sufficient pressure to induce a spraying pattern in the oil as it exits the lube oil distribution passage system and enters the engine compartment. This spraying pattern will insure that the majority of the engine part surfaces are covered with lubricating oil. The pressure necessary to achieve this spraying pattern will vary with the type and configuration of the respective engine and the viscosity of the oil introduced. However, it is preferred that this introduction pressure be essentially equal to the oil pressure during engine operation to insure adequate oil coverage. Pumping pressure during addition of the fresh oil is provided by the pump 62 of external pump device 50.

In order to introduce fresh oil into the engine, using the external pump device 50 of the present invention, valve V-4 is rotated to the first position to permit fluid contact between conveying line 66 and fill line 60. Pump 62 is actuated and fresh oil is drawn through conveying line 66 and fill line 60 into fill line 54 of device 10 of the present invention.

When a complete crankcase flushing is desired, the empty and fill lines of the external pump device 50 are attached to the device 10 of the present invention. In the preferred embodiment the empty line is emptying line 86 and the fill line is fill line 60. Initial preliminary air purge of the engine oil filter 36, and internal lube oil distribution passages 19 may be initiated to remove spent oil from these areas. Flushing fluid can then be introduced through fill line 34 and inlet hose 24 into the engine compartment through engine oil filter 36, the internal lube oil distribution passage system 19, and any oil cooler lines. The pressure for the introduced flushing fluid is provided by the pump 72 of external pump device pump 50. The pressure with which the flushing fluid is introduced is sufficient to induce a spray pattern as the flushing fluid exits the internal lube oil distribution passage system so that the flushing fluid contacts the surfaces of the engine components and oil pan with sufficient force to dislodge a portion of the residual spent oil and contaminants by mechanical and detergent scrubbing action.

To initiate introduction of the flushing fluid to the engine to be cleaned using the external pump device 50 of the present invention, valves V-1 and V-2 are rotated to their first position and valve V-4 is rotated to its second position establishing a conduit from clean flush fluid reservoir 76 through conveying line 78, connecting line 80 with pump 72 and filter 82, through fill line 60 into engine fill line 54 described previously. Pump 72 is activated to pump flushing fluid from the reservoir 76 into the engine.

The flushing fluid may be introduced before, after, or during the spent oil pump-out step. Where the spent oil is extremely viscous, it is desirable to add a portion of the flushing fluid before or during the pump-out step to reduce the oil viscosity by dilution and improve the flow characteristics of the spent oil. Once the oil is diluted or if dilution is not required, the spent oil is pumped out to an appropriate holding tank in the manner described previously. Additional flushing fluid is introduced to continue the cleaning process.

While a certain amount of residual spent oil and contaminants are removed merely by the mechanical scrubbing action of the spray, additional amounts can be dissolved or removed due to the sheeting action of the flushing fluid as it trickles down the oil pan walls and due to the chemical detergency interaction between the residual spent oil and the flushing fluid.

The cleaning action of the flushing fluid can be increased by recirculation through the engine and external pump device 50. When employing the pump device 50 of the present invention, the recirculating step can be initiated by rotating value V-1 to the second position establishing a complete circuit between the pump device 50 and internal combustion engine. The flushing fluid passes through at least one external pump filter 82 as well as the engine oil filter 36 during recirculation to remove particulates and suspended contaminants. The filtration media is any suitable material which can remove such contaminants from the recirculating fluid in an effective and efficient manner.

The flushing fluid introduced is any material or composition which is completely miscible with motor oil and exhibits suitable detergency and cleaning characteristics but is inert to the oil pan, gaskets, and associated engine components. It is also preferable that the flushing fluid provides sufficient lubricity or sheeting action to enhance the sheeting action of the flushing fluid dislodging particulate contaminants and carrying them with the flushing fluid as it flows under gravity back to the oil pan. The flushing fluid employed is, preferably, one which is compatible with waste oil and is not detrimental in any subsequent waste oil recycling processes and one which does not deposit undesirable residual constituents which adhere to oil pan surfaces and engine components.

In the preferred embodiment, the flushing fluid employed in the present invention consists essentially of a hydrocarbon miscible with engine oil, a compatible detergent capable of improving the detergency of the flushing fluid and a lubricating additive capable of enhancing the sheeting action of the flushing fluid.

The hydrocarbon employed in the preferred embodiment is an organic fluid selected from the group consisting of high flash point kerosene and mixtures thereof. The flash point of the kerosene is preferably above about 150° F. It is to be understood that other fluids having similar characteristics to high flash point kerosene may be employed in admixture or substituted in the flushing fluid.

The detergent employed in the present invention is an organic fluid selected from the group consisting of butyl cellosolve, DOWFAX surfactants, and mixtures thereof. These and similar surfactants are employed in sufficient concentration to provide detergency in the flushing fluid.

The lubricating additive employed in the flushing fluid is, preferably, a methyl ester having a carbon chain between twelve and twenty carbon atoms or mixtures of such methyl esters in an amount sufficient to provide lubricity and sheeting action to the flushing fluid.

In including the lubricating additive in the flushing fluid of the present invention, it is believed that the lubricating additive would impart characteristics which would increase the sheeting action and cleaning characteristics of the flushing fluid. It has been found, quite unexpectedly that the flushing fluid of the present invention also imparts some residual surface lubricity, which is advantageous in that it provides preliminary lubricant to the engine parts as newly added fresh motor oil is added and circulated through the crankcase.

The introduced flushing fluid, dislodged contaminants and spent oil accumulate in the oil pan 21 during the spraying step. The flushing fluid which accumulates in the oil pan 21 may pumped out for recirculation if desired. The pumped-out flushing fluid is directed into contact with various filtration media contained in the external pump device 50 to remove the contaminants and particulates dislodged from the engine components and contained in the flushing fluid. This process also protects the engine oil filter from particulate loading during recirculation in the event that the vehicle owner wishes to continue to use the old engine oil filter. The filtered flushing fluid is then recirculated back to the fill hose 54 for reintroduction into the engine. If desired, the quality of the pumped out material can be tested or viewed to determine the effectiveness of the cleaning process. Depending on the effectiveness of the cleaning process, the recirculation of flushing fluid can continue for as long can as is necessary until a sufficient or desired quantity of the contaminants has been removed.

Once the flushing fluid recirculation is completed, or when it is not desired the flushing fluid is pumped out to a suitable environmentally safe holding tank and an amount of fresh oil appropriate for the respective internal combustion engine is introduced into the engine in the manner described previously.

Because the flushing fluid has passed through the automobile oil filter 36 during the flushing and optional recirculation steps; the major portion of the residual oil contained in the engine oil filter has been removed by the completion of the steps. After these steps have been completed, the pumping action of pump 72 is discontinued and an optional brief air purge may be initiated to empty any remaining flushing fluid from the engine oil filter, the internal lube oil distribution passages and any oil cooler lines. The air introduced is preferably dehumidified and is introduced under sufficient pressure and for sufficient duration to remove any residual flushing fluid.

To initiate air purge using the external pump device 50 of the present invention, valve V-4 is rotated to its first position connecting compressed air source 68 with fill line 60 through line 66. Once the air purge is completed or simultaneous therewith, the spent flushing fluid may be pumped from oil pan 21 on to a suitable spent flushing fluid reservoir such as reservoir 90. Valves V-2 and V-3 are rotated to their second positions, establishing a connection from the engine oil pan 21 through pump-out line 48 through emptying line 86, and the portion of connecting line 80 having pump 72, waste conveying line 88 and on to spent flushing fluid reservoir 90. Because the spent flushing fluid will be held in reservoir 90 for recycling or disposal, final filtration is not required. However, a suitable filter unit can be positioned upstram of the spent flushing fluid reservoir if desired.

Once the flushing fluid has been removed, valve V-4 is maintained in the first position. Pump 62 is activated to convey fresh oil form the fresh oil reservoir through the line 66 and fill line 60 and into the engine. After the amount of oil appropriate for the associated engine is added, the pump 62. After the fresh oil has been added, the coupling members can be disconnected and the engine operated in the normal manner.

If desired, a small preliminary portion of fresh oil may be introduced through the engine fill line, the oil filter and internal lube oil distribution passages and removed in the manner described previously. This optional step preferably occurs when air purges are not employed or when additional flushing fluid removal is required. The introduction of this preliminary portion of fresh oil aids in the removal of any flushing fluid from the filter and internal lube oil distribution passages.

The present invention provides a cleaner environment by the virtual elimination of oil vapors inhaled by the operator, and a complete collection system for the spent oil and a method for handling the used oil filter from which virtually all of the spent oil has been removed. The present invention also provides a simplified, high speed oil change process and an enhanced cleaning process if desired in which greater amounts of residual spent oil and contaminants can be removed in a manner which reduces the time necessary to accomplish an oil change, the mess associated therewith, and provides a cleaner crank case environment for the fresh motor oil. This improves motor filter life and improves engine performance.

Having described the process of the present invention, what is claimed is:

1. A device for facilitating flushing and scrub cleaning of moveable components in an internal combustion engine having an oil pan with a drain plug opening an internal lube oil distribution passage system, comprising:

an oil filter adapter adapted to be sealingly connected to an engine oil filter mounting boss located on the internal combustion engine, said adapter having at least two nozzles, a first nozzle in fluid communication with an engine oil pump located in the oil pan and a second nozzle in fluid communication with the internal lube oil distribution passage system of the engine;

a remote oil filter mounting boss having first and second apertures, said mounting bracket positioned on the engine remote from said engine oil filter mounting boss;

an engine oil filter removably mounted on said remote oil filter mounting boss;

a first inlet hose connected to said first nozzle and said first aperture of said mounting bracket;

a second outlet hose connected to said second nozzle and said second aperture on said mounting bracket;

a pump-out line connected to the drain plug opening having a coupling member at a remote end, said coupling member adapted to removably contact an external pump device; and a fill line connected to said first inlet hose, said fill line capable of transferring oil to said engine oil filter, the internal lube oil distribution passage system and the movable components, said fill line having a coupling member attached at a remote end, said coupling member adapted to removably contact said external pump device.

2. A process for changing oil in an internal combustion engine equipped with the oil change device of claim 1, the process comprising the steps of:

connecting said pump-out line and said fill line to said external pump device;

removing spent oil from the oil pan by application of a suitable removal force through said pump-out line on said spent oil contained in the oil pan, said removal force exerted by said external pump device;

after said spent oil is removed, introducing a measured amount of fresh oil into the engine through the internal lube oil distribution passage system in fluid communication with said fill line, said fresh oil introduced under sufficient pressure to produce a spray pattern sufficient to permit contact between said fresh motor oil and the moveable engine components, said measured amount being appropriate for the associated internal combustion engine; and uncoupling said pump-out line and said fill line from said external pump device after said fresh oil is introduced.

3. The process of claim 2 wherein said removal force exerted through said pump-out line is a vacuum force.

4. The process of claim 2 wherein said force exerted through said pump-out line is a suction force.

5. The process of claim 2 further comprising the step of introducing purge gas through said fill line, said engine oil filter and internal lube oil distribution passage system in an amount sufficient to remove spent oil from said fill line, said engine oil filter, and the internal lube oil distribution passage system, said introducing step occurring prior to said introduction of fresh oil.

6. The process of claim 5 further comprising the following steps:

removing said engine oil filter from said remote oil filter mounting boss after introduction of purge air; and positioning a new engine oil filter in said remote oil filter mounting boss.

7. The process of claim 2 further comprising the following steps:

removing said engine oil filter from said remote oil filter mounting boss after said spent oil has been removed; and positioning a new engine oil filter in said remote oil filter mounting boss.

8. A process for changing oil in an internal combustion engine equipped with the oil change device of claim 1, the process comprising the steps of:

connecting said pump-out line and said fill line to said external pump device;

introducing purge gas through said connected fill line, said engine oil filter, and the internal lube oil distribution passage in an amount sufficient to remove spent oil from said fill line, said engine oil filter, and the internal lube oil distribution passage system; and removing spent oil form the oil pan by application of a suitable removal force through said pump-out line on said spent oil contained in the oil pan, said removal force exerted by said external pump device.

introducing a flushing fluid through said fill line, said engine oil filter and the internal lube oil distribution passage system, said flushing fluid under sufficient pressure to create a spray pattern whereby said flushing fluid contacts exposed surfaces of the moveable engine components and surfaces of the oil pan thereby removing residual spent oil;

removing said introduced flushing fluid containing spent oil from the oil pan through said pump-out line;

after said flushing fluid has been removed, introducing a measured amount of fresh oil into the engine, said fresh fill oil being introduced in an amount appropriate for the associated engine; and uncoupling said pump-out line and said fill line from said external pump device after said measured amount of fresh oil has been introduced.

9. The process of claim 8 wherein said measured amount of fresh oil is introduced into the engine through said fill line, said engine oil filter and the internal lube oil distribution passage system, said fresh oil introduced under sufficient pressure to permit contact between said fresh motor oil and the movable engine components.

10. The process of claim 9 further comprising the following steps:

introducing a preliminary portion of additional fresh oil through said fill line, said engine oil filter and the internal lube oil distribution passage system prior introduction of said measured amount of fresh oil;

mixing said preliminary portion of fresh oil with said introduced flushing fluid present in said fill line, said oil filter and the internal oil distribution passages; and emptying said mixture of said flushing fluid and said preliminary portion of additional fresh oil prior to introduction of said measured amount of fresh oil.

11. The process of claim 10 wherein said preliminary portion of additional fresh oil is introduced prior to removal of said flushing fluid.

12. The process of claim 10 further comprising the step of recirculating said flushing fluid through said external pump device and reintroducing said fluid into contact with the moveable components of the engine through said fill line, said engine oil filter, and the internal lube oil distribution system.

13. The process of claim 12 wherein said flushing fluid is brought contact with external filtration media associated with said external pump device.

14. The process of claim 12 comprising the following further steps:

introducing purge air through said fill line, said engine oil filter and the internal lube oil distribution passage system in an amount sufficient to remove said mixture of said flushing fluid and said preliminary portion of additional fresh oil;

removing said engine oil filter from said remote oil filter mounting boss after introduction of said purge air; and inserting a new engine oil filter in said remote oil filter mounting boss.

15. The process of claim 8 wherein said flushing fluid consists essentially of:

an organic fluid selected from the group consisting of a hydrocarbon fluid having a flash point above about 150° F.;

an additive selected from the group consisting of DOWFAX, butyl cellosolve and mixtures thereof present in an amount sufficient to enhance detergency action of said flushing fluid; and a lubricant additive selected form the group consisting of methyl esters with carbon chains having between about twelve and about twenty carbon atoms, said lubricant additive being present in an amount sufficient to enhance sheeting action of said flushing fluid.

16. A process for changing oil in an internal combustion engine equipped with the oil change device of claim 1, the process comprising the steps of:

connecting said pump-out line and said fill line to said external pump device;

introducing purge gas through said fill line, said engine oil filter and the internal lube oil distribution passage system in an amount sufficient to remove spent oil from said engine oil filter, and the interanl lube oil distribution passage system;

removing spent oil from the oil pan by application of a suitable removal force through said pump-out line on said spent oil contained in the oil pan, said removal force exerted by said external pump device;

introducing a flushing fluid through said fill line, said engine oil filter and the internal lube oil distribution passage system, said flushing fluid under sufficient pressure to create a spray pattern whereby said flushing fluid contacts exposed surfaces of the moveable engine components and surfaces of the oil pan thereby removing residual spent oil;

removing said introduced flushing fluid containing said residual spent oil from the oil pan through said pump-out line;

after said residual spent oil and introduced flushing fluid is removed form the oil pan, removing said engine oil filter from communication with the engine;

replacing said removed engine oil filter with a new oil filter;

after said new engine oil filter is in place, introducing a measured amount of fresh oil into the engine through said fill line, said new engine oil filter and the internal lube oil distribution passage system, said fresh oil introduced under sufficient pressure to permit contact between said fresh oil and the moveable engine components, said fresh engine oil introduced in an amount appropriate for the associated internal combustion engine; and uncoupling said pump-out line and said fill line from said external pump device after said fresh oil is introduced.

17. The process of claim 16 comprising the following further steps:

removing said flushing fluid from the oil pan;

directing said removed flushing fluid through said external pump device; and reintroducing said removed flushing fluid into contact with the moveable components of the engine through said fill line, said engine oil filter and the internal lube oil distribution passage system.

18. The process of claim 17 wherein said flushing fluid is brought into contact with external filtration media associated with said external pump device.

19. The process of claim 17 further comprising the following step:

introducing a second amount of purge gas through said fill line, said engine oil filter and the internal lube oil passage system after said flushing fluid has been removed and prior to engine oil filter removal, said second amount of purge gas sufficient to remove said flushing fluid from said fill line, said engine oil filter, and the internal lube oil distribution passage system.

20. The process of claim 19 further comprising the following step:

immediately after introduction of said second amount of purge gas, introducing a preliminary portion of additional fresh oil through said fill line, said engine oil filter and the internal lube oil distribution passage system;

introducing a third amount of purge gas through said fill line, said engine oil filter and the internal lube oil passage system after said preliminary portion of additional fresh oil has been added; and removing said preliminary portion of additional fresh oil and flushing fluid contained therein from said oil pan.

21. The device of claim 1 wherein said pump device comprises:

a pump device fill line having a quick connect coupling member adapted to be releasably connected to said engine fill line said engine fill mounted in the engine-compartment and attached to said oil change device, said fill line having a diverter valve movable between a first and a second position;

an emptying line having a quick connect coupling member adapted to be releasably connected to said pump-out line located on the engine-mounted oil change device;

a fresh oil fill unit in fluid contact with said fill line, said fresh oil fill unit including:

(a) a fresh oil storage reservoir;

(b) a fresh oil conveying conduit having a first and a second end, said first end in fluid communication with said reservoir (c) a first pump located in said fresh oil conduit; and (d) an intermediate conveying line in fluid communication with said second end of said fresh oil conveying conduit, said intermediate conveying line having a remote end in fluid communication with said fill line;

a spent oil pump-out unit in fluid contact with said emptying line, said spent oil pump-out unit including:

(a) a connecting line having a first end and a second end, said second end in fluid communication with said emptying line;

(b) a second pump located in said connecting line;

(c) a waste conveying line having a first end and a second end, said waste conveying line; and (d) a spent oil environmentally safe collection receptacle in fluid communication with said first end of said waste conveying line.

22. The device of claim 21 further comprising:

an environmentally safe-to-use gas purge unit, said gas purge unit including:

a source of compressed gas; and a gas conveying line connected to said compressed gas source, said gas conveying line being connectable to said fill line of said engine mounted oil change device.

23. The device of claim 22 wherein said gas purge unit further includes a gas dehumidifer.

24. The device of claim 21 further comprising:

a flushing fluid introduction unit, said flushing fluid introduction unit including:

an environmentally safe flushing fluid holding reservoir;

a flushing fluid conveying line in fluid communication with said flushing fluid reservoir;

a first diverter valve located at a junction of said connecting line, said emptying line and said flushing fluid conveying line, said diverter valve movable between a first position connection establishing a fluid connection between said connecting line and said emptying line and a second fluid connection between said flushing fluid conveying line and said connecting line;

said second pump contained in connecting line;

a filter located in said connecting line; and a second diverter valve located at a junction of said connecting line, said fill line and said intermediate conveying line, said second diverter valve movable between a first position establishing a fluid connection between said intermediate conveying line and said fill line and a second position establishing a fluid connection between said connecting line and said fill line.

25. The device of claim 24 wherein a flush fluid recirculation circuit is established by the movement of said first diverter valve from said second position to said first position.

26. An external pump device for initiating rapid oil change in an internal combustion engine, said pump device comprising:

a fill line releasably attachable to a suitable orifice in the internal combustion engine;

an emptying line releasably attachable to a suitable orifice in the internal combustion engine.

a fresh oil fill unit in fluid contact with said fill line said fresh oil fill unit including:

(a) a fresh oil storage reservoir;

(b) a fresh oil conveying conduit having a first and a second end, said first end in fluid communication with said fresh oil storage reservoir;

(c) a first pump located in said fresh oil conveying conduit; and (d) an intermediate conveying line in fluid communication with said second end in fluid communication with said fill line;

an environmentally safe gas purge unit, said gas purge unit including:

(a) a source of compressed gas; and (b) a gas conveying line connecting said compressed gas source with said intermediate conveying line;

a spent oil pump-out unit in fluid contact with said emptying line, said spent oil pump-out unit including:

(a) a connecting line having a first end and a second end, said second end in fluid communication with said emptying line;

(b) a second pump located in said connecting line;

(c) a waste-conveying line having a first end and a second end, said waste conveying line being in fluid contact with said connecting line; and (d) an environmentally safe spent oil collection receptacle in fluid communication with said first end of said waste conveying line.

27. The device of claim 26 further comprising:

a flushing fluid introduction unit, said flushing fluid introduction unit including:

an environmentally safe flushing fluid holding reservoir;

a flushing fluid conveying line in fluid communication with said flushing fluid reservoir;

a first diverter valve located at the junction of said connecting line, said emptying line, and said flushing fluid conveying line, said diverter valve moveable between a first position establishing a fluid connection between said connecting line and said emptying line and a second fluid connection between said flushing fluid conveying line and said connecting line;

said second pump contained in said connecting line;

a filter located in said connecting line; and a second diverter valve located at the junction of said connecting line, said fill line and said intermediate conveying line; said second diverter valve movable between a first position establishing a fluid connection between said intermediate conveying line and said fill line and a second position establishing a fluid connection between said connecting line and said fill line.

* * * * *